US006370503B1

(12) United States Patent
Ortega et al.

(10) Patent No.: US 6,370,503 B1
(45) Date of Patent: Apr. 9, 2002

(54) METHOD AND APPARATUS FOR IMPROVING SPEECH RECOGNITION ACCURACY

(75) Inventors: Kerry A. Ortega, Raleigh, NC (US); Hans Egger, Vienna (AT); Arthur Keller, Boca Raton, FL (US); Ronald E. Vanbuskirk, Indiantown, FL (US); Huifang Wang, Boynton Beach, FL (US); James R. Lewis, Delray Beach, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/345,071

(22) Filed: Jun. 30, 1999

(51) Int. Cl.[7] .............................................. G10L 15/26
(52) U.S. Cl. ...................... 704/235; 714/246; 714/251
(58) Field of Search ............................... 704/231, 235, 704/246, 251, 256, 276

(56) References Cited

U.S. PATENT DOCUMENTS

| 5,684,924 A | * 11/1997 | Stanley et al. ............... 704/251 |
| 5,715,469 A | * 2/1998 | Arning ........................ 707/533 |
| 5,829,000 A | * 10/1998 | Huang et al. ................ 704/252 |
| 5,855,000 A | * 12/1998 | Waibel et al. ............... 704/235 |
| 5,864,805 A | * 1/1999 | Chen et al. .................. 704/235 |
| 5,909,667 A | * 6/1999 | Leontiades et al. ......... 704/275 |
| 5,950,160 A | * 9/1999 | Rozak ......................... 704/252 |
| 6,064,959 A | * 5/2000 | Young et al. ................ 704/251 |

* cited by examiner

Primary Examiner—Richemond Dorvil
Assistant Examiner—Daniel Abebe
(74) Attorney, Agent, or Firm—Akerman Senterfitt (57) ABSTRACT

A transcription system (100) includes a computer (102), a monitor (104), and a microphone (110). Via the microphone, a user of the system provides input speech that is received and transcribed (204) by the system. The system monitors (205) the accuracy of the transcribed speech during transcription. The system also determines (210) whether the accuracy of the transcribed speech is sufficient and, if not, automatically activates (214) a speech recognition improvement tool and alerts (212) the user that the tool has been activated. This tool could also be manually activated (206) by the user. The type of recognition problem is identified (216) by the user or automatically by the system, and the system provides (218) possible solution steps for enabling the user to adjust (219) system parameters or modify user behavior in order to alleviate the recognition problem. The system also provides the user the ability to test (222) the transcription process in order to determine whether the solution has improved the recognition accuracy.

6 Claims, 8 Drawing Sheets

| Problem 402 | Possible Solution Steps 404 |
|---|---|
| System frequently does not recognize an individual word while dictating | Check if correct user<br>Enter problem word<br>Record word – then based on diagnostic, do one or more of the following:<br>    Adjust Audio Levels if bad<br>    Change Pronunciation<br>    Suggest enrolling (If not already fully enrolled) |
| System frequently does not recognize an individual word or phrase while controlling applications | Check if correct user<br>Enter problem word<br>Is the word/phrase in an application's grammar?<br>    Mini-Tutorial(WCIS, Say What You Can See)<br>Record word<br>    Adjust Audio Levels if bad<br>    Suggest enrolling (If not already fully enrolled) |
| System never recognizes word | Enter problem word<br>System checks if the word is in the Vocabulary<br>    Mini-Tutorial (Error correction)<br>System checks if the word is in the topic on the system<br>    Suggest selecting topic if not already Selected<br>Record word – then based on diagnostic, do one or more of the following:<br>    Adjust audio levels<br>    Suggest enrolling (If not already fully enrolled) |
| Audio Levels too high or too low | Adjust Audio Levels |
| Words or commands appear without speaking | Mini-Tutorial (Go-to-sleep)<br>Adjust Audio Levels |
| Nothing happens when you speak | Microphone Setup (Full) – If no signal detected, record word Mini-Tutorial<br>-Microphone Button (Especially if microphone turned 'off' test) |
| Hears a noise as a word | Adjust Audio Levels<br>Ask if Noise-Canceling Microphone<br>Mini-Tutorial (Microphone placement)<br>Suggest New Enrollment for Noisy Environment? |
| Generally poor recognition<br>406     408 | Check if correct user<br>Record words<br>    Adjust Audio Levels<br>    Suggest enrolling (If not already fully enrolled)<br>    Mini-Tutorials<br>        -Having a good microphone<br>        -Having a good sound card<br>        -Microphone placement<br>        -Setting up a good dictation environment<br>        -Good speech habits (relaxed, natural voice, etc.) |

METHOD AND APPARATUS FOR IMPROVING SPEECH RECOGNITION ACCURACY

BACKGROUND OF THE INVENTION

The field of the invention is methods and apparatuses for continuous speech recognition. More particularly, the invention relates to methods for presenting the user with control over speech recognition accuracy.

Speech recognition systems currently exist which enable a user to continuously dictate speech into a microphone, whereupon that speech is transformed to text by a computer, and the text is displayed on the computer's monitor. In a continuous speech recognition system designed to decode speech without pauses between words, it is reasonable to expect that errors of decoding will take place and will have to be corrected by the user. Often, a particular type of error will continuously recur during a particular dictation session. For example, the system may repeatedly mis-recognize a particular word, such as "and," for example.

Prior-art speech recognition systems receive and transcribe received speech based on various system parameters and databases, such as audio levels, topic libraries, and speaker-dependent training databases, for example. In some systems, a user trained on the system may be able to determine what type of recognition accuracy problem is occurring, and adjust or change the various parameters or databases in order to improve the recognition accuracy of the user's speech. Many users, however, may not have the inclination or patience to learn how to identify recognition accuracy problems or how to adjust the system parameters to improve upon those problems. In addition, some users may prefer not to monitor the text being generated during a speech recognition session, and may not realize that recognition problems are occurring. Both of these types of users may become frustrated and decide not to use the system.

What is needed is a method and apparatus for transcribing dictated speech that enables a user easily to change system parameters or user behaviors in order to improve the recognition accuracy of the system. What is further needed is a method and apparatus for transcribing dictated speech that can identify when speech recognition problems are occurring, and can assist the user in identifying the particular type of problem.

SUMMARY OF THE INVENTION

The present invention includes an apparatus and method for transcribing speech that receives input speech, and transcribes the input speech into transcribed speech that includes a sequential listing of words in text format. During transcription, the method and apparatus monitors the accuracy of the transcribed speech, and determines whether the accuracy of the transcribed speech is sufficient. If the accuracy is not sufficient, the method and apparatus automatically activates a speech recognition improvement tool. Using the speech recognition improvement tool, the method and apparatus improves the accuracy of the transcribing process.

The method is carried out by a transcription apparatus which includes at least a computer, a monitor, and a microphone. The method can be executed by a machine that executes a plurality of code sections of a computer program that is stored on a machine readable storage.

A general object of the invention is to provide a transcription system user with the ability and the information to easily change system parameters and/or user behaviors in order to improve the recognition accuracy of the system. Another object of the invention is to provide the user with this ability automatically.

BRIEF DESCRIPTION OF THE DRAWING

FIG. 4 illustrates an exemplary table that lists, for a number of possible problem types, some possible solution steps that could be taken to mitigate or eliminate that problem;

DESCRIPTION OF THE PREFERRED EMBODIMENT

Figure 1:
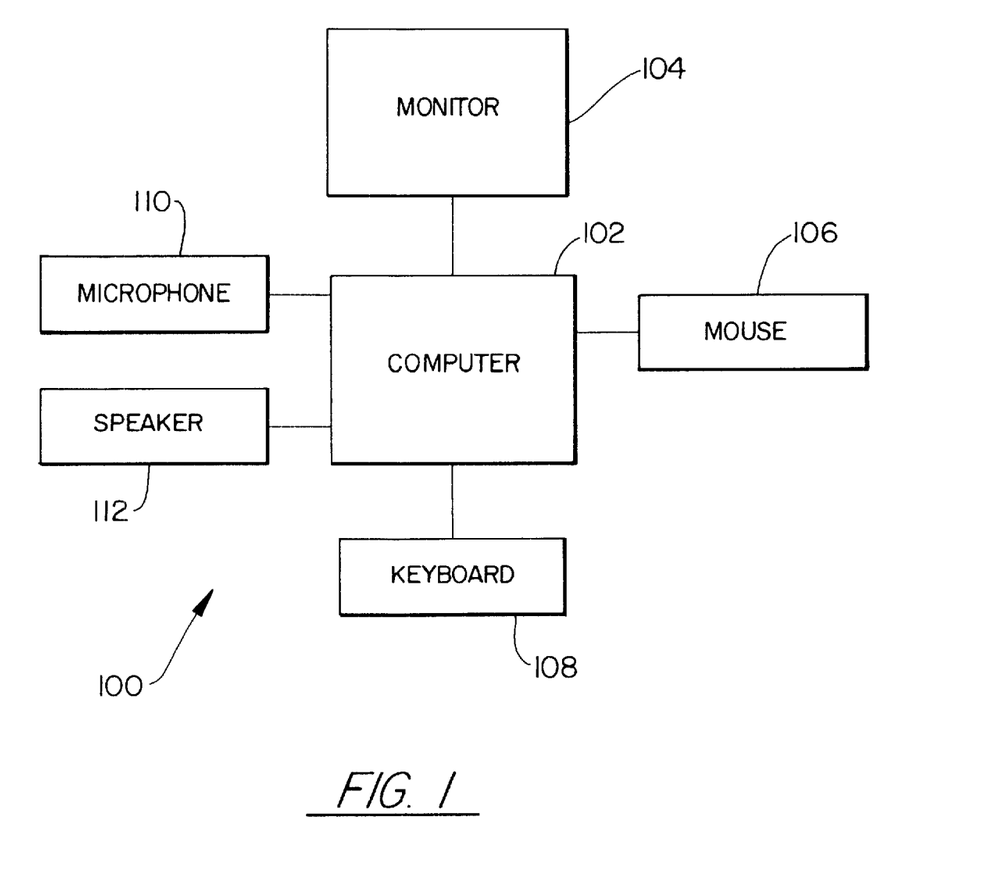
FIG. 1 illustrates a simplified block diagram of a speech recognition system in accordance with a preferred embodiment of the present invention.

FIG. 1. illustrates a simplified block diagram of a speech recognition system in accordance with a preferred embodiment of the present invention. Speech recognition system 100 includes a computer 102, such as a personal computer or workstation, having a display monitor 104, a mouse 106 or other pointing device, and a keyboard 108. System 100 also includes a microphone 110 used to dictate to computer 102, and a speaker 112 used for providing acoustic feedback to the user. Computer 102 is specifically equipped with the interface required to acquire acoustic information from microphone 110. Such equipment may be present on the computer mother board or daughter card, such as SOUND-BLASTER (TM Creative Labs), or through other means.

Monitor 104, mouse 106, keyboard 108, and speaker 112 form a user interface with which the user of speech recognition system 100 can initiate, control, and monitor the transcription process. In accordance with a preferred embodiment, computer 102 provides various screens, via monitor 104, to help the user to adjust various parameters which affect the recognition accuracy during a particular speech recognition session.

Operation of transcription system 100 is described in detail in conjunction with FIGS. 2–12. During operation, speech input is provided by the user via microphone 110, and a decoder engine (not shown) implemented by computer 102 continuously receives the input speech and creates text output that is displayed on monitor 104. In order to transcribe the speech, the decoder engine calls on data from information stored within the computer's memory (not shown), such as system vocabularies, acoustic models, and language based models, for example. The decoder engine then performs operations, such as matching acoustic input with acoustic models, for example, in order to create the text translation of the input speech.

The language based models provide data about common word sequences so the engine may determine what candidate phrases are likely. This is important for choosing between words and phrases which contain phonetically similar words (e.g., "to", "two", and "too", or "there", "their", and "they're"). Once various factors have been considered by the decoder engine, text is made available by the engine as text data. Having decoded some user speech input, either the decoder engine or some application may display that text to the user through the user interface (e.g., monitor 104 or speaker 112).

At this point, the user may detect a problem with the speech recognition process or, in a preferred embodiment, the system may detect the problem and notify the user. Using a graphical user interface (GUI), the user is then guided through adjusting various system parameters or modifying user behavior in order to improve the speech recognition accuracy.

Figure 2:
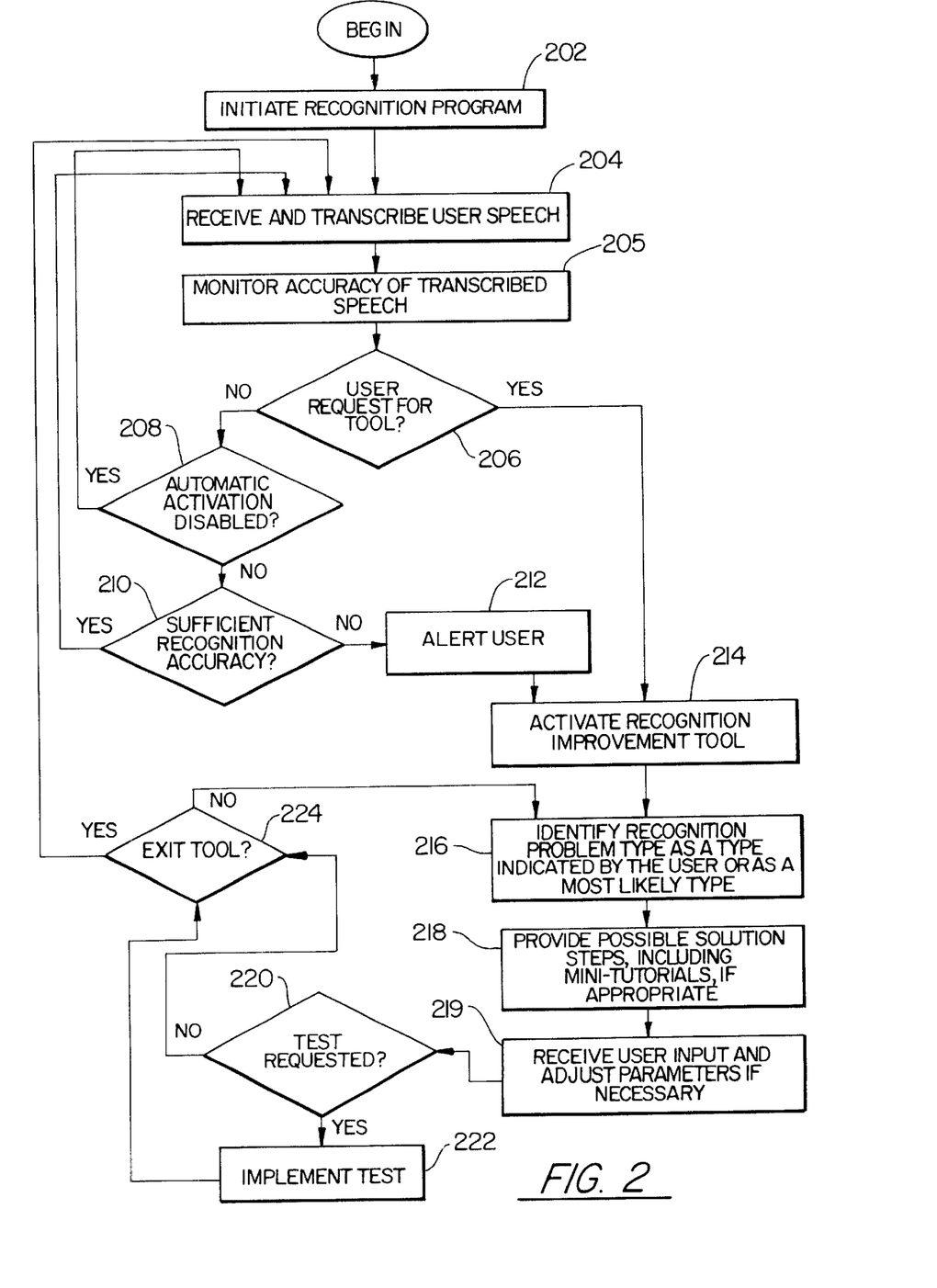
FIG. 2 illustrates a flowchart of a method for enabling a user to improve speech recognition accuracy of a speech recognition system in accordance with a preferred embodiment of the present invention.

FIG. 2 illustrates a flowchart of a method for enabling a user to improve speech recognition accuracy of a speech recognition system in accordance with a preferred embodiment of the present invention. The method desirably is performed using a speech recognition system, such as system 100 (FIG. 1).

The method begins, in step 202, when the user initiates the speech recognition program. Initiation of the speech recognition program typically would occur by the user prompting the computer to download (if necessary), initialize, and initiate a software application. The program would then automatically, or as a result of various inputs from the user, begin receiving and transcribing input speech in step 204, and displaying the transcribed speech on the user's computer monitor. The transcription process yields a sequential listing of words in text format.

In a preferred embodiment, the program monitors the accuracy of the speech recognition in step 205. Monitoring the accuracy of the transcribed speech can be done, for example, by keeping track of the number or percentage of transcribed words that fall below a recognition threshold, or that ate corrected by the user. In a preferred embodiment, the accuracy is continuously monitored (e.g., on a word-by-word basis). In alternate embodiments, the accuracy could be monitored by checking, periodically or aperiodically, the accuracy of the transcribed speech.

When the accuracy of the transcribed speech becomes unacceptable, the system automatically activates a recognition improvement tool that enables the user easily to adjust the system parameters to improve recognition accuracy, as described below. Because automatic activation of the recognition accuracy improvement tool could become annoying, the continuous monitoring or automatic initiation features can be disabled by the user in a preferred embodiment. Also in a preferred embodiment, the user is able, at any time, to manually activate the recognition improvement tool.

Steps 206–210 illustrate decision steps that precede activation of the recognition improvement tool. These steps could be performed as part of the program flow, or could be interrupt driven, for example. In any event, the computer continues to receive and transcribe speech, in step 204, until one of decision steps 206–210 cause the program to advance to step 212 or 214.

In step 206, a determination is made whether the user has requested that the recognition improvement tool be activated. In a preferred embodiment, the user could make this request at any time during the speech recognition session. Typically, a user would make the request when the user notices, based on the text being displayed, that the system is not accurately transcribing the user's speech. If the user has requested that the recognition improvement tool be activated, then the program proceeds to step 214, which will be described later. If the user has not requested that the tool be activated, then the program proceeds to step 208.

In step 208, a determination is made whether the automatic tool activation feature is disabled. In a preferred embodiment, this feature is initially enabled, and can thereafter be disabled or enabled manually by the user. The user may be able to access a series of menu options, one of which is to enable or disable the feature. Alternatively, each time the tool is activated (in step 214, described below), the user could be prompted to indicate whether he or she would like the automatic activation feature to be disabled for the remainder of the speech recognition session, or until the user re-enables the activation feature. If the feature is disabled, then the program iterates as shown in FIG. 2, and the system continues to receive and transcribe speech.

If the feature is not disabled, a determination is made, in step 210, whether the speech recognition accuracy is sufficient. This determination would typically be influenced by whether the speech recognition system is a dictation system or a command and control system. In a command and control system, input speech is compared with entries in a relatively small vocabulary library. The system would not take action unless it had a high degree of confidence that the spoken word matches one of the command words within the library. If the recognition level is below a particular threshold, for example, the system could determine that the word is not recognized. If a pre-defined percentage of words fall below the threshold or if a pre-defined number of consecutive words are unrecognizable, the system could determine that the recognition accuracy is insufficient.

In a dictation system, on the other hand, each spoken word is compared to a much larger library, and the system outputs the library word that has the closest correlation to the spoken word. Although a recognition threshold method also could be used on a dictation system, other methods might be more suitable for determining the recognition accuracy. For example, if the user is able to edit the text produced by the system, the system could determine-what percentage of words the user corrected. If the number or percentage of corrected-words is, higher than a pre-defined number or a pre-defined percentage, the system could determine that the recognition accuracy is insufficient.

Regardless of the type of speech recognition system, other ways of determining whether recognition accuracy is insufficient could also be used, such as signal-to-noise measurements, and other methods that would be obvious to one of skill in the art based on the description herein.

If the accuracy of the speech recognition is sufficient, then the program iterates as shown in FIG. 2, and the system continues to receive and transcribe speech. If the accuracy of the speech recognition is not sufficient, then the user is alerted, in step 212, that the program is activating the recognition improvement tool. This alert could be given, for example, by use of an audible or visual alarm.

The automatic tool activation feature coupled with the user alert provides the advantage that a user who is not closely monitoring the displayed text will know to stop dictating in order to interact with the recognition improvement tool. This feature gives the user more freedom to concentrate on other tasks during the speech recognition session.

Based on the determinations made in steps 206 and 210, the speech recognition improvement tool is activated in step 214. Activation of the tool involves the download (if necessary), initialization, and initiation of the software modules that comprise the tool. In a preferred embodiment, a window is displayed on the monitor screen that indicates that the program has activated the speech recognition improvement tool. From this point forward, the user interacts with the tool in order to attempt to improve the accuracy of the transcribed speech.

Figure 3:
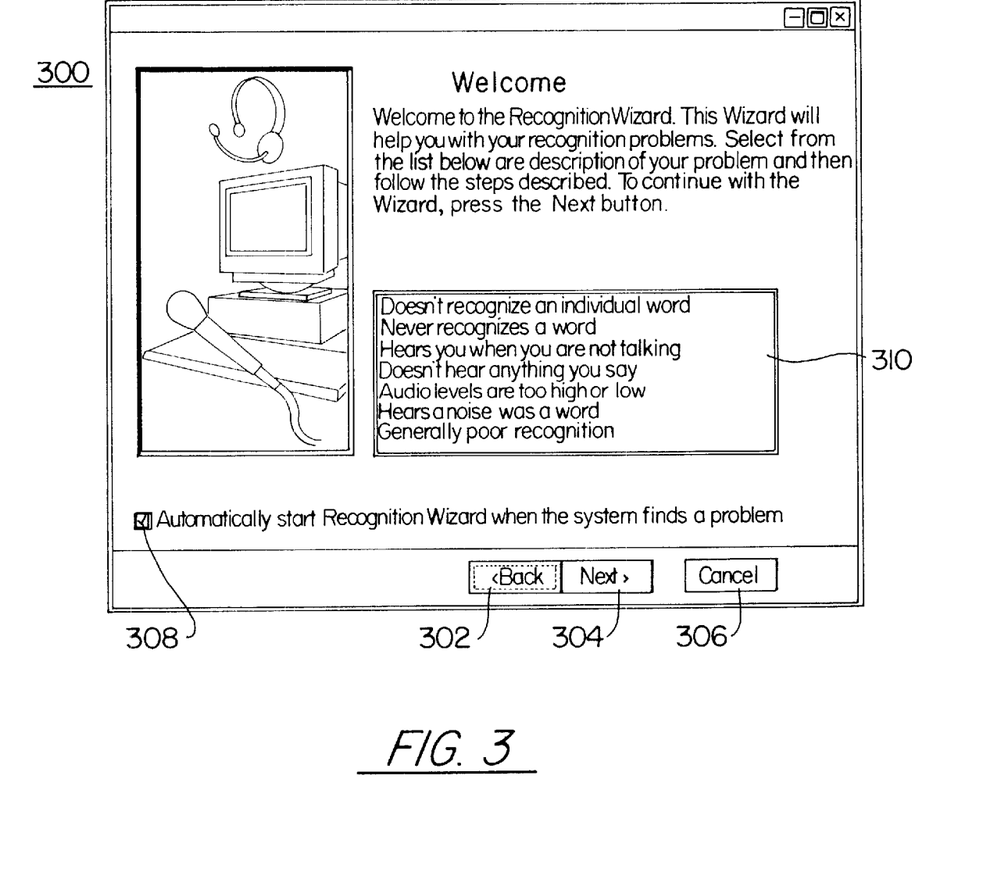
FIG. 3 illustrates an exemplary display screen used for providing initial interaction between the user and the; speech recognition improvement tool.

FIG. 3 illustrates an exemplary display screen used for providing initial interaction between the user and the speech recognition improvement tool. In a preferred embodiment, each display screen exemplified in FIGS. 3 and 5–12 are displayed on a computer monitor, such as monitor 104 (FIG. 1). Display screen 300 desirably includes a "welcome" message, or the like, that indicates to the user that the tool has been activated. In a preferred embodiment, screen 300 also includes other elements, such as those exemplified by elements 302–310, each of which is described in more detail below. In alternate embodiments, additional or different elements could be included on screen 300, or any or all of elements 302–310 could be included on other screens.

Elements 302–306 enable the user to advance through the various screens provided by the tool, or to cancel and exit the tool. The "Back" button 302, for example, causes the tool to display the screen that was displayed just prior to the currently displayed screen. The "Next" button 304, on the other hand, causes the tool to display the screen that would be displayed next by the tool. If the screen to be displayed next depends on input the user must provide in the current screen, and the user has not provided that input (e.g., the user has not identified a problem type in element 310), then the tool could display an error message to the user, indicating that the user must provide input before the tool can proceed to the next screen. In addition, the user is able to exit the tool at any time by clicking the "Cancel" button 306, or by using some other exiting procedure (e.g., pressing the "Escape" button on the keyboard, or selecting "Exit" from a drop down menu).

As referred to previously, screen 300 could provide a selectable element, such as element 308, that enables the user to disable the automatic activation feature of the tool. Initially, element 308 would be set to always automatically activate the tool upon system identification of a problem. By de-selecting element 308, the user would disable the feature. Consequently, the user would be required to manually activate the tool for the remainder of the speech recognition session, unless the user re-activated the automatic activation feature.

Referring back to FIG. 2, in step 216, the recognition problem type is identified. The problem type could be indicated by the user or could be automatically identified by the tool as a most likely problem type, as described below. If the user manually activated the tool (e.g., in step 206), then the tool would display a number of possible recognition problem types to the user, in a preferred embodiment. This is illustrated in FIG. 3, where the tool displays, in text element 310, a number of possible recognition problem types. By using the mouse or other common ways of selecting an option (e.g., up/down arrows), the user provides input indicating which of the possible recognition problem types the user considers as the problem type being encountered. Typically, the user would select the problem type that corresponds to the type of recognition problem the user has noticed while reviewing the transcribed text.

If the tool was automatically activated (e.g., in step 210), then the tool automatically identifies, if possible, the most likely recognition problem type as the problem the system encountered (i.e., the problem that caused the system to determine that recognition accuracy was insufficient), in a preferred embodiment. In this case, rather than displaying element 310, the tool could display a message indicating that the tool has identified a problem, and that the tool will assist the user in adjusting the system parameters to mitigate or eliminate the problem. Alternatively, element 310 could be displayed with the identified problem highlighted. If it is not possible for the system to identify the most likely problem type, or in an alternate embodiment, the tool could provide a number of possible recognition problem types, as illustrated in element 310.

Referring back to FIG. 2, once the problem type is identified by the system or by the user, the tool provides the possible solution steps to the user in step 218. In a preferred embodiment, the user can cause the tool to provide the possible solution steps by clicking the "Next" button 304. By the user clicking "Next," the tool displays a new screen that indicates the possible solution steps for the selected problem.

FIG. 4 illustrates an exemplary table that lists, for a number of possible problem types, some of the possible solution steps that could be taken to mitigate or eliminate that problem. The list of FIG. 4 would not be displayed to the user, but instead is shown to illustrate how the tool identifies the next screen to display.

In column 402, a number of possible recognition problem types are listed. These problem types correspond to the problem types listed in element 310 of FIG. 3. In column 404, a number of possible solution steps are listed that could be taken in order to mitigate or eliminate the corresponding problem type. In various alternate embodiments, more, fewer or different problem types and/or solution steps could be handled by the tool. The problem types and solution steps listed in columns 402 and 404 are for exemplary purposes only, and are not intended to limit the scope of the present invention.

In addition to providing various solution steps to the user, as listed in column 404, the tool also could provide various "mini-tutorials" to the user, as described below, which educate the user on setting system parameters or on dictating correctly, for example. A number of these mini-tutorials also are listed in column 404 for illustration purposes.

To illustrate operation of the tool, reference is made to both FIGS. 3 and 4. Suppose the user has selected, from element 310 of FIG. 3, the recognition problem that the system "Doesn't recognize an individual word." This problem type corresponds to problem 406 of FIG. 4. Upon clicking the "Next" button 304, the tool would provide a new screen to the user that indicates one of the possible solution steps listed in step list 408 of FIG. 4. For example, the tool would provide the screen corresponding to the solution step: "Check if correct user." After the user executes that solution step by interacting with that screen, the tool could display a next screen corresponding to the solution step: "Enter problem word." This sequence would continue until all solution steps (and mini-tutorials, if available) had been presented to the user, or until the user indicated that he or she wanted to go back to a previous step or exit the tool using the "Back" or "Cancer" buttons 302, 306, respectively. In an alternate embodiment, all solution steps (and mini-tutorials, if available) pertaining to that particular problem could be provided to the user in list form, and the user could select which step the user wants the tool to execute.

FIGS. 5–11 illustrate exemplary display screens used for providing the user with possible solutions to various recognition problems, and also for providing the user with mini-tutorials. The set of screens illustrated in FIGS. 5–11 do not include all possible screens that could be provided for all possible problems, but instead are intended to exemplify some solutions to commonly encountered problems.

Figure 5:
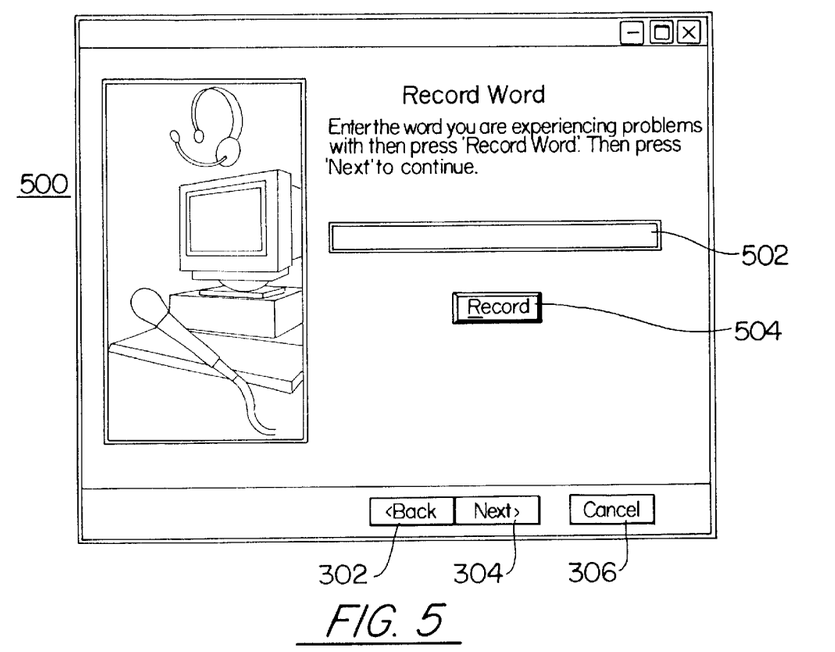
FIG. 5 illustrates an exemplary display screen to assist a user in executing the "Record Word" solution step.

FIG. 5 illustrates an exemplary display screen to assist a user in executing the "Record Word" solution step. The tool would display screen 500 if, for example, the user or system identified (in step 216, FIG. 2) that the recognition problem is that the system does not recognize an individual word. In such event, the user is prompted to enter the spelling of the mis-recognized word in element 502. Thereafter, the user would press the "Record" button 504 and then speak the word into the microphone. The tool would then store the word and pronunciation into the appropriate vocabulary or topic associated with that user, adding the pronunciation to any previously stored pronunciations for that word.

The tool could perform additional functions as well. For example, the tool could perform audio quality measurements to verify that it received a clean, noise-free signal. If necessary, the tool could prompt the user to re-record the word or take some other action.

Based on the tool's analysis of the recorded word, the tool could suggest that the user implement one or more other solution steps. For example, the tool could determine that the audio recording levels are not adjusted properly (e.g., they could be too low or too high), and the tool could guide the user through adjustment of the audio levels.

Alternatively, the tool could suggest to the user that the user fully enroll with the system, if the user had not already done so. An enrolled speaker is a speaker who has previously trained the speech recognition engine. During the training process, the system creates a speaker dependent model which is unique for the particular speaker. The speaker dependent model can then be used, during speech recognition sessions, to better recognize the enrolled speaker's speech. An unenrolled speaker is a speaker who has not previously trained the speech recognition engine. Consequently, speaker dependent models do not exist for unenrolled speakers. Instead, a speaker independent model is used to transcribe an unenrolled speaker's speech. Using a speaker independent model may cause the system to have more mis-recognition problems than it would otherwise have using a speaker dependent model.

Figure 6:
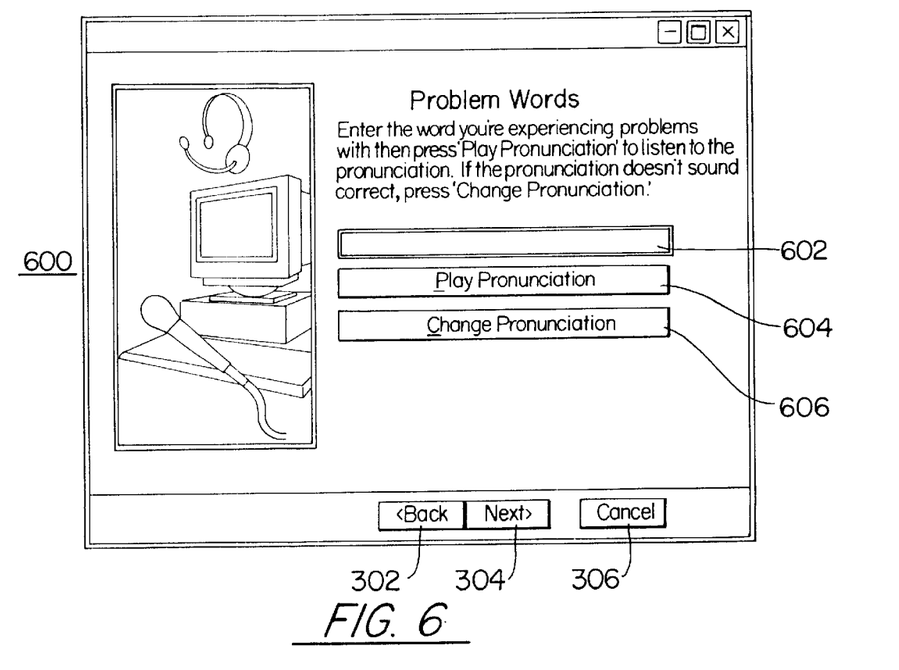
FIG. 6 illustrates an exemplary display screen to assist a user in executing the "Problem Words" solution step.

FIG. 6 illustrates an exemplary display screen to assist a user in executing the "Problem Words" solution step. The tool would display screen 600 if, for example, the user or system identified (in step 216, FIG. 2) that the recognition problem, is that the system never recognizes a particular word. Similar to the "Record Word" screen 500 (FIG. 5), the user is prompted to enter the spelling of the mis-recognized word in element 602, unless the word had been previously entered on another screen. The user can then have the tool play the pronunciation of the word that the system recognized by clicking the "Play Pronunciation" button 604. The tool would then verify that the word is in the system vocabulary or any active topic library. If the word is in the system, the tool would retrieve the word from the appropriate vocabulary or topic library, perform text-to-speech transformation, and play the word to the user via the speaker. If more than one pronunciation exists for the word, the tool could play all available pronunciations. If the word is not in the system, the user would be prompted to record the word.

If the user is not satisfied with the pronunciations, the user can change the pronunciation by clicking the "Change Pronunciation" button 606. The user would then speak the word into the microphone. The tool would then store the pronunciation into the appropriate vocabulary or topic associated with that user, adding the pronunciation to any previously stored pronunciations for that word. As with the "Record Word" process, the tool could perform .additional functions as well.

Figure 7:
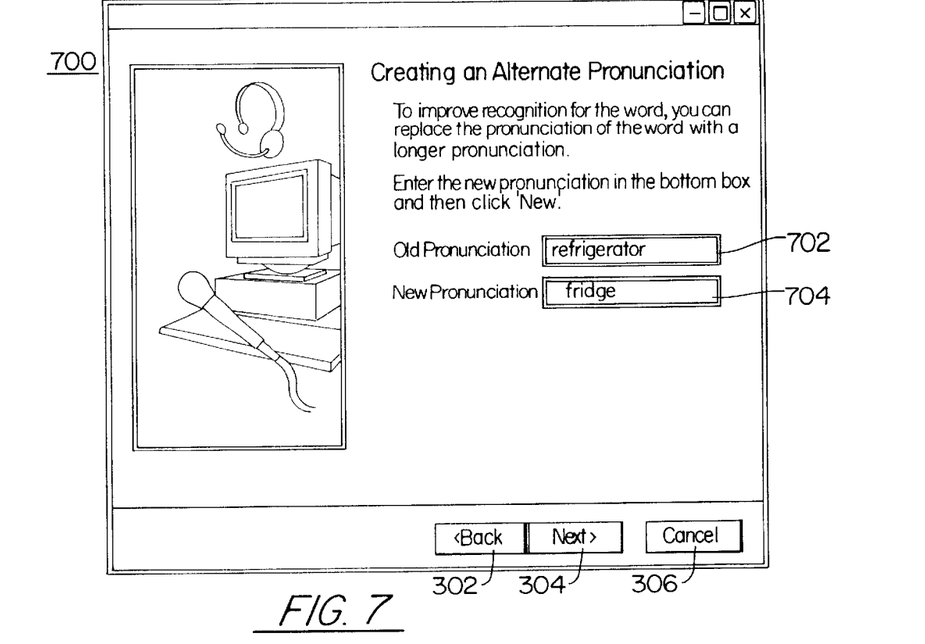
FIG. 7 illustrates an exemplary display screen to assist a user in executing the "Creating an Alternate Pronunciation" solution step.

FIG. 7 illustrates an exemplary display screen to assist a user in executing the "Creating an Alternate Pronunciation" solution step. The tool would display screen 700 if, for example, the user was unable to improve recognition of a particular word using the "Problem Words" solution step. The "Creating and Alternate Pronunciation" step enables the user to specify a new pronunciation for a word that currently exists in a vocabulary or topic. This feature is useful, for example, if a user has difficulty pronouncing a particular word, or if the user would rather use an abbreviated version of a word. For example, a user may want the system to output "refrigerator" each time the user says "fridge." The user would enter "refrigerator" into the "Old Pronunciation" element 702, and would enter "fridge" into the "New Pronunciation" element 704. The system, thereafter, would output "refrigerator" each time the user says "fridge."

Figure 8:
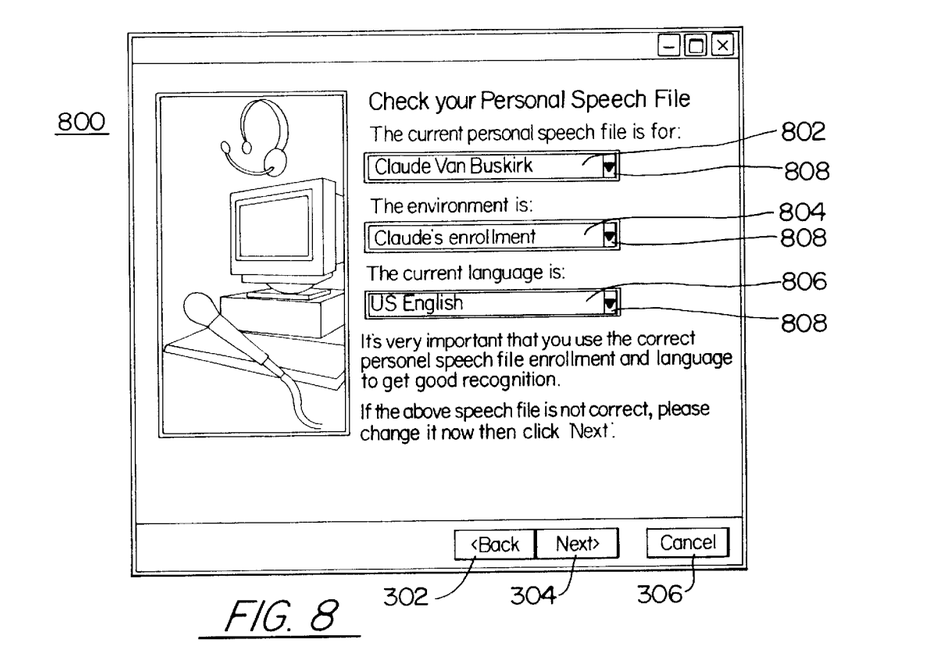
FIG. 8 illustrates an exemplary display screen to assist a user in executing the "Checking Your Personal Speech File" solution step.

FIG. 8 illustrates an exemplary display screen to assist a user in executing the "Checking Your Personal Speech File" solution step. The tool would display screen 800 if, for example, the user or system identified (in step 216, FIG. 2) that the recognition problem is that the system has generally poor recognition. In such case, it is possible that the system is using the wrong speaker dependent model. Accordingly, screen 800 would display, in element 802, the speech file that the system is currently using. In element 804, if the system has multiple speaker dependent models for the user identified in element 802 based on different environments (e.g., office and car), the tool can display, in element 804, which environment the system considers the user to be in. In addition, if the system has multiple speaker dependent models for the user identified in element 802 based on different languages (e.g., English and French), the tool can display, in element 806, which language the system considers the user to be speaking. The user can then modify any one of elements 802–806 by selecting a different user, environment, and/or language. In a preferred embodiment, the user is able to click a drop-down element 808 associated with any of elements 802–806, and a list of available alternatives will be displayed.

Figure 9:
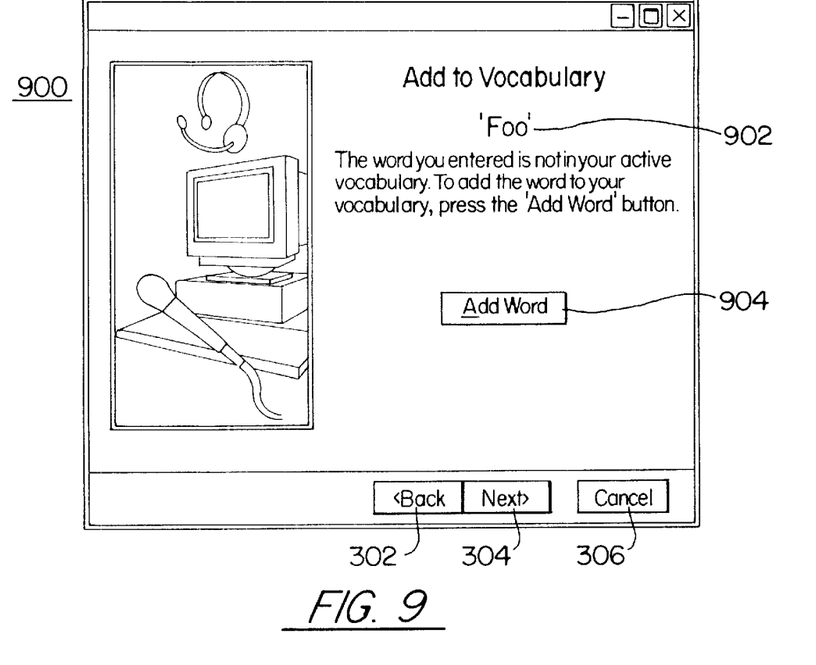
FIG. 9 illustrates an exemplary display screen to assist a user in executing the "Add to Vocabulary" solution step.

FIG. 9 illustrates an exemplary display screen to assist a user in executing the "Add to Vocabulary" solution step. The tool would display screen 900, for example, after a user has entered a new word using the "Problem Words" solution step. As stated previously, the tool could verify that the entered word is in the system vocabulary or any active topic library in conjunction with the "Problem Words" solution step. When the tool recognizes that a recorded word is not in the system vocabulary (or vocabularies), screen 900 displays the word 902 (e.g., "Foo"), and prompts the user to indicate whether the user wants to add the word to the vocabulary. If the user clicks the "Add Word" button 904, then the word is added to the vocabulary. If the user has multiple vocabularies stored on the system, the tool would give the user the option to add the word to other vocabularies and, if the user desires, to activate any one or all of those vocabularies for the balance of the current speech recognition session, unless later deactivated by the system or the user.

Figure 10:
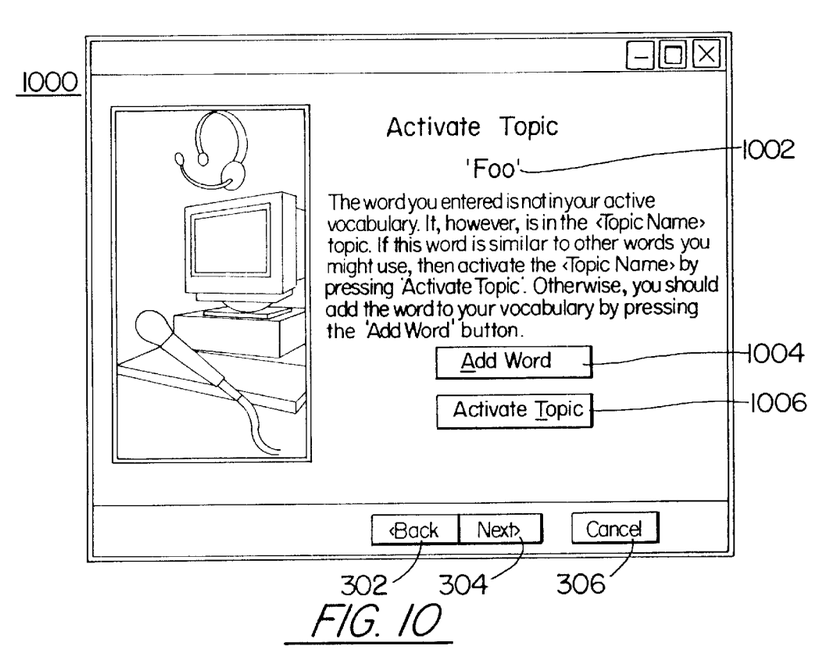
FIG. 10 illustrates an exemplary display screen to assist, a user in executing the "Activate Topic" solution step.

FIG. 10 illustrates an exemplary display screen to assist a user in executing the "Activate Topic" solution step. Similarly to screen 900 (FIG. 9), the tool would display screen 1000, for example, after a user has entered a new word using the "Problem Words" solution step. When the tool recognizes that a recorded word is not in the system vocabulary (or vocabularies) or any active topic library, but is found in one of the user's inactive topic libraries, screen 1000 displays the word 1002 (e.g., "Foo"), and prompts the user to indicate whether the user wants to add the word to the vocabulary, or activate the topic within which the word was found. If the user clicks the "Add Word" button 1004, then the word is added to the vocabulary. If the user has multiple vocabularies stored on the system the tool would give the user the option to add the word to other vocabularies and, if the user desires, to activate any one or all of those vocabularies for the balance of the current speech recognition session. If the user clicks the "Activate Topic" button 1006, then the inactive topic within which the word was found is activated for the balance of the current speech recognition session, unless later deactivated by the system or the user.

Figure 11:
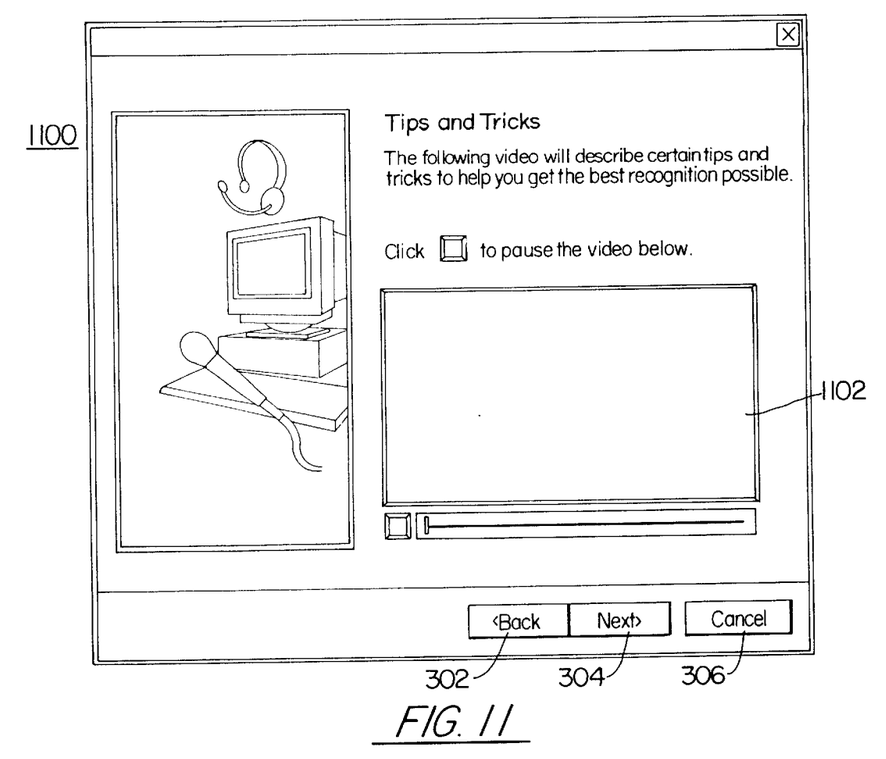
FIG. 11 illustrates an exemplary display screen for a mini-tutorial to educate a user in adjusting a system parameter or in dictating properly.

FIG. 11 illustrates an exemplary display screen for a mini-tutorial to educate, a user in adjusting a system parameter or in dictating properly. The tool would display screen 1100 if, for example, one or more mini-tutorials are available that could help the user solve a particular problem identified in step 216, FIG. 2. Each mini-tutorial could instruct the user on setting system parameters and or adjusting user behaviors in order to alleviate the recognition problem. For example, if the recognition problem is that nothing happens when the user speaks, the tool could give the user the option to play a mini-tutorial relating to how to use the microphone. In a preferred embodiment, a video tutorial is played for the user in element 1102, and the user could pause or replay the tutorial at his or her option. In an alternate embodiment, the tutorial could be a written set of instructions designed to educate the user or walk the user through a particular procedure (e.g., how to adjust a system parameter). A number of possible mini-tutorials are listed in column 404 of FIG. 4 for exemplary purposes. In alternate embodiments, more, fewer or different tutorials could be provided by the tool. In addition, the user may be able to access any of the available tutorials through drop-down menus, help procedures, or other ways.

The screens illustrated in FIGS. 5–11 do not indicate all possible screens that could be used to assist the user in resolving recognition problems. More, fewer or different screens could also be provided.

Referring back to FIG. 2, after the user has been provided with possible solution steps in step 218, and the tool has received user inputs, when appropriate, and adjusted system parameters, if necessary in step 219, a determination is made, in step 220, whether the user wants to test the system. The user may want to test the system, for example, to determine whether a new user behavior, a change that the user has made to a system parameter (e.g., audio settings), or a word that the user has added to the system has solved the recognition problem that the system was encountering. If the user indicates that he or she would like to test the system, then the tool implements the test, in step 222. In a preferred embodiment, the test is implemented by the tool providing a display screen that the user can interact with.

Figure 12:
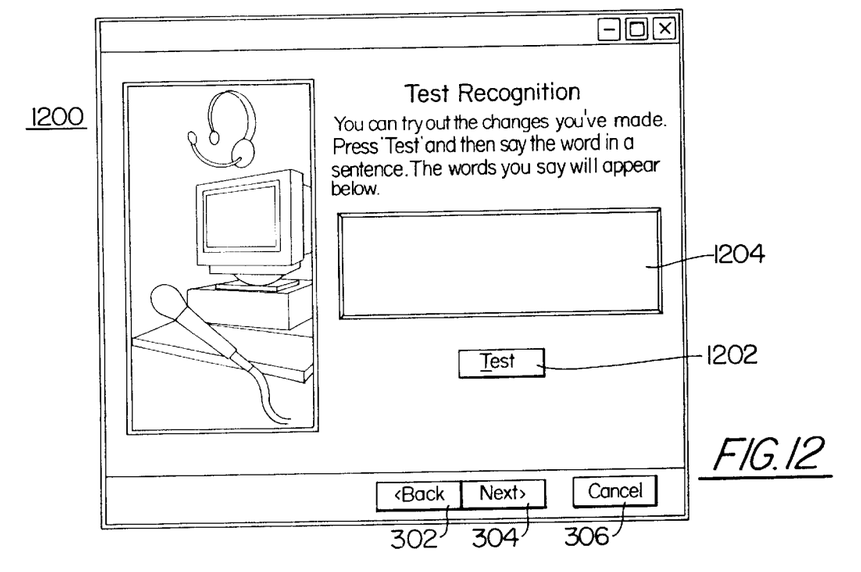
FIG. 12 illustrates an exemplary display screen to assist a user in testing the system's recognition capabilities.

FIG. 12 illustrates an exemplary display screen to assist a user in testing the system's recognition capabilities. Screen 1200 is displayed when the user indicates that he or she would like the tool to implement a recognition test in step 220 (FIG. 2). Screen 1200 prompts the user to dictate a word or sentence. If the user clicks the "Test" button 1202, and begins speaking, the system receives the test input speech, transcribes the speech, and displays the text in element 1204. If the user is not satisfied with the transcription, the user could continue to interact with the tool in order to resolve any remaining problems. For example, the user could return to screen 300 (FIG. 3), and begin the recognition improvement process again. Alternatively, the user could be pointed to another available source for solving the particular recognition problem (e.g., a Web page or a toll-free phone number). If the user is satisfied with the transcription, the user can exit the tool by clicking the "Cancel" button 306.

The layout and content of the screens illustrated in FIGS. 3 and 5–12 are for exemplary purposes only, and those layouts and contents are not intended to limit the scope of the present invention. In various alternate embodiments, additional or different screens or elements could be provided, or any or all of the elements could be included on other screens. In addition, screens could be provided to assist the user in mitigating or eliminating other recognition problems.

Referring back to FIG. 2, if the user has not requested a test, or after the test has been performed, a determination is made whether the user has indicated that he or she wants to exit the tool in step 224. This determination could be based on a user prompt asking the user whether he or she wants to exit. For example, the prompt could be provided after the tool has provided all possible solution steps for a particular problem. Alternatively, the determination could be made at any time if the user has clicked the "Cancel" button 306 on any one of the tool's screens. If the user has not indicated that he or she wants to exit the tool, then the method returns to a previous step within the tool, such as step 216. If the user has indicated that he or she does want to exit the tool; then the tool is closed and the method returns to the step 204 of receiving and transcribing the user speech. The user could, at any time, indicate that the user wants to quit the current speech recognition session, even though this option is not shown in FIG. 2.

Thus, a method and apparatus for transcribing speech have been described which overcome specific problems, and accomplish certain advantages relative to prior art methods and mechanisms. A method and apparatus for transcribing dictated speech are provided that enable a user easily to change system parameters or user behaviors in order to improve the recognition accuracy of the system. Also provided is a method and apparatus for transcribing dictated speech that can identify when speech recognition problems are occurring, and assisting the user in identifying the particular type of problem. The method can be automatically activated by the system, and the user can be notified of that activation in a preferred embodiment. This frees a user from having to closely monitor transcribed text during the transcription session. The method also provides education to the user, via mini-tutorials, so that the user can modify his or her behaviors or adjust system parameters in order to achieve more accurately transcribed speech.

The foregoing descriptions of the specific embodiments will so fully reveal the general nature of the invention that others can, by applying current knowledge, readily modify and/or adapt the embodiments for various applications without departing from the generic concept. Therefore, such adaptations and modifications should, and are intended to be comprehended within the meaning and range of equivalents of the disclosed embodiments. In particular, while a preferred embodiment has been described in terms of various recognition problems, solution steps, and screens, those of skill in the art will understand, based on the description herein, that the method of the present invention also could be implemented using more, fewer, or different problems, steps, and screens. Moreover, those skilled in the art will appreciate that the flowcharts presented herein are intended to teach the present invention and that different techniques for implementing program flow that do not necessarily lend themselves to flowcharting may be devised. For example, each task discussed herein may be interrupted to permit program flow to perform background or other tasks. In addition, the specific order of tasks may be changed, and the specific techniques used to implement the tasks may differ from system to system. It should be understood that specific implementations of speech recognition systems may include various processing components, data sets, and data paths not shown or described here.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims.

We claim:

1. A method for transcribing speech performed by a transcription system, the method comprising the steps of:
   a) receiving input speech;
   b) transcribing the input speech into transcribed speech that includes a sequential listing of words in text format;
   c) monitoring speech recognition accuracy of the transcribed speech by keeping track of a number of words that fall below a recognition threshold;
   d) determining whether the accuracy of the transcribed speech is sufficient;
   e) automatically activating a speech recognition improvement tool upon a determination that the accuracy of the transcribed speech is not sufficient; and
   f) improving the accuracy of the transcribing step using the speech recognition improvement tool.

2. The method as claimed in claim 1, wherein the step of determining comprises the step of determining that the accuracy is not sufficient if the number of words that fall below the recognition threshold is higher than a pre-defined number.

3. The method as claimed in claim 1, wherein the step of determining comprises the step of determining that the accuracy is not sufficient if the number of words that fall below the recognition threshold is higher than a pre-defined percentage.

4. A method for transcribing speech performed by a transcription system, the method comprising the steps of:
   a) receiving input speech;
   b) transcribing the input speech into transcribed speech that includes a sequential listing of words in text format;
   c) monitoring speech recognition accuracy of the transcribed speech by keeping track of a number of words that are corrected by a user of the transcription system;
   d) determining whether the accuracy of the transcribed speech is sufficient;
   e) automatically activating a speech recognition improvement tool upon a determination that the accuracy of the transcribed speech is not sufficient; and
   f) improving the accuracy of the transcribing step using the speech recognition improvement tool.

5. The method as claimed in claim 4, wherein the step of determining comprises the step of determining that the accuracy is not sufficient if the number of words that are corrected by the user is higher than a pre-defined number.

6. The method as claimed in claim 4, wherein the step of determining comprises the step of determining that the accuracy is not sufficient if the number of words that are corrected by the user is higher than a pre-defined percentage.

* * * * *